US012598209B2

(12) United States Patent (10) Patent No.: US 12,598,209 B2
Ghosh et al. (45) Date of Patent: Apr. 7, 2026

(54) DEVICE VULNERABILITY RISK ASSESSMENT SYSTEM

(71) Applicant: Arista Networks, Inc., Santa Clara, CA (US)

(72) Inventors: Arunabh Ghosh, San Jose, CA (US); Gary Joshua Golomb, Los Gatos, CA (US); Eric Jon Poynton, Denver, CO (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 100 days.

(21) Appl. No.: 18/471,938

(22) Filed: Sep. 21, 2023

(65) Prior Publication Data

US 2025/0106237 A1 Mar. 27, 2025

(51) Int. Cl.
*H04L 29/00* (2006.01)
*H04L 9/40* (2022.01)
(52) U.S. Cl.
CPC ................................ *H04L 63/1433* (2013.01)
(58) Field of Classification Search
CPC .................................................. H04L 63/1433
See application file for complete search history.

(56) References Cited

U.S. PATENT DOCUMENTS 9,781,148 B2 * 10/2017 Mahaffey .............. H04W 12/02
9,798,883 B1 * 10/2017 Gil ...................... H04L 63/1433

| | | | |
|---|---|---|---|
| 10,311,975 B2 * | 6/2019 | Young .................... | G16H 50/30 |
| 10,362,062 B1 | 7/2019 | Dash et al. | |
| 10,841,338 B1 * | 11/2020 | Lin .......................... | H04L 63/20 |
| 11,706,240 B2 * | 7/2023 | Sugarbaker ......... | H04L 63/1433 |
| 11,736,508 B2 * | 8/2023 | Fitzgerald ........... | H04L 63/1433 |
| | | | 726/25 |
| 11,768,945 B2 * | 9/2023 | Chiarelli .............. | G06F 21/577 |
| | | | 726/25 |
| 12,244,636 B1 * | 3/2025 | Anand ................ | H04L 63/1433 |
| 2016/0105801 A1 * | 4/2016 | Wittenberg ........... | H04W 4/029 |
| | | | 455/411 |
| 2017/0021764 A1 * | 1/2017 | Adams .................... | G06Q 40/08 |
| 2020/0004936 A1 * | 1/2020 | Avital ..................... | G06F 21/31 |
| 2020/0274628 A1 * | 8/2020 | Towfiq ................... | H04L 41/22 |
| 2020/0314134 A1 * | 10/2020 | Izrael .................... | G06F 21/554 |
| 2020/0322369 A1 * | 10/2020 | Raghuramu .......... | H04L 63/102 |
| 2021/0044613 A1 * | 2/2021 | Sugarbaker ......... | H04L 63/1433 |
| 2021/0056475 A1 * | 2/2021 | Patel .................. | G06Q 10/0637 |

(Continued)

OTHER PUBLICATIONS

VulDB, v16.22.9, retrieved from the Internet <<https://vuldb.com>> on Sep. 21, 2023, 3 pages.

(Continued)

*Primary Examiner* — Don G Zhao
(74) *Attorney, Agent, or Firm* — Sprinkle IP Law Group

(57) ABSTRACT

Systems and methods for risk assessment of network devices are disclosed herein. In particular, embodiments may determine risk scores for devices within a network that are highly individualized to each network device by leveraging data from a number of data sources. These data sources may include search results or the determination of network device data associated with the vulnerabilities, weaknesses, configuration errors or related conditions affecting each device or device type, ensuring a rich and pertinent set of data for risk score determination.

16 Claims, 4 Drawing Sheets

(56) References Cited

U.S. PATENT DOCUMENTS

| | | | | |
|---|---|---|---|---|
| 2021/0173940 | A1* | 6/2021 | Mylrea | G06F 16/953 |
| 2021/0185074 | A1* | 6/2021 | Fitzgerald | H04L 63/1408 |
| 2021/0237724 | A1* | 8/2021 | Zhao | B60W 50/0205 |
| 2021/0279337 | A1* | 9/2021 | Mosby | G06N 20/00 |
| 2021/0312058 | A1* | 10/2021 | Chiarelli | G06Q 10/067 |
| 2021/0390190 | A1* | 12/2021 | Walker | G06Q 30/0236 |
| 2021/0390196 | A1* | 12/2021 | Lavine | H04L 63/102 |
| 2023/0231854 | A1* | 7/2023 | Blake | H04L 63/1425 |
| | | | | 726/4 |
| 2023/0239303 | A1* | 7/2023 | Hutelmyer | H04L 63/1425 |
| | | | | 726/4 |
| 2024/0193280 | A1* | 6/2024 | Reguly | G06F 17/11 |
| 2024/0356960 | A1* | 10/2024 | Griffin | H04L 63/1433 |
| 2024/0372884 | A1* | 11/2024 | Zhou | H04L 63/1433 |
| 2025/0030719 | A1* | 1/2025 | Das | H04L 63/1433 |
| 2025/0061212 | A1* | 2/2025 | Walker | G06F 21/566 |
| 2025/0103441 | A1* | 3/2025 | Dickens | H04L 63/20 |

OTHER PUBLICATIONS

Shodan Exploits, retrieved from the Internet <<https://exploits. shodan.io/welcome>> on Sep. 21, 2023, 1 page.

Nmap: The Network Mapper, retrieved from the Internet <<https:// nmap.org>> on Sep. 21, 2023, 3 pages.

* cited by examiner

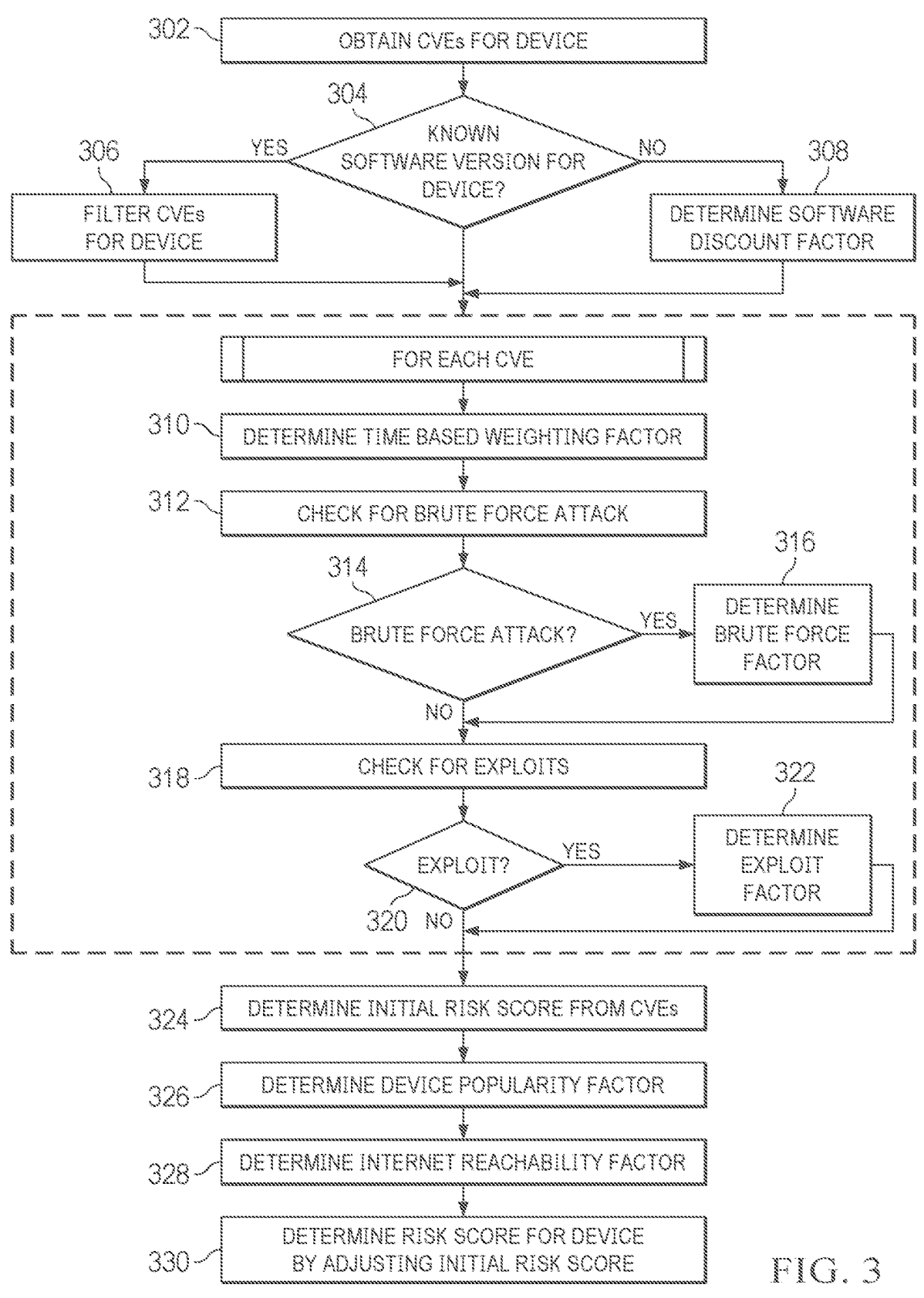

302 — OBTAIN CVEs FOR DEVICE

304 KNOWN SOFTWARE VERSION FOR DEVICE?

YES — 306 FILTER CVEs FOR DEVICE

NO — 308 DETERMINE SOFTWARE DISCOUNT FACTOR

FOR EACH CVE

310 — DETERMINE TIME BASED WEIGHTING FACTOR

312 — CHECK FOR BRUTE FORCE ATTACK

314 BRUTE FORCE ATTACK?

YES — 316 DETERMINE BRUTE FORCE FACTOR

NO

318 — CHECK FOR EXPLOITS

320 EXPLOIT?

YES — 322 DETERMINE EXPLOIT FACTOR

NO

324 — DETERMINE INITIAL RISK SCORE FROM CVEs

326 — DETERMINE DEVICE POPULARITY FACTOR

328 — DETERMINE INTERNET REACHABILITY FACTOR

330 — DETERMINE RISK SCORE FOR DEVICE BY ADJUSTING INITIAL RISK SCORE

FIG. 3

DEVICE VULNERABILITY RISK ASSESSMENT SYSTEM

BACKGROUND

In the rapidly evolving landscape of cybersecurity, assessing the risk posed by devices within a network is a critical task for security professionals. The accurate evaluation of potential vulnerabilities enables organizations to prioritize resources and implement effective countermeasures to mitigate threats. Organizations of all sizes and across various industries, including finance, healthcare, retail, government, technology, and education, confront these challenges as they strive to safeguard their digital assets, protect sensitive information, and maintain their reputations. These same entities (and network security personnel employed by such entities) currently face limitations in their ability to efficiently and effectively evaluate device risk and prioritize mitigation efforts. These limitations can result in vulnerabilities being overlooked or insufficiently addressed, potentially leading to data breaches and other security incidents.

In the main, this situation exists because current solutions to assess device risk in network environments have largely proven inadequate. To illustrate in more detail, several approaches are typically utilized to tackle these types of problems. Each of these approaches, however, has their own specific flaws. For example, manual tracking and analysis of vulnerabilities in a network (e.g., security vulnerabilities pertaining to network devices) is time-consuming and often prone to human error. While vulnerability scanners (which automatically identify potential weaknesses in systems) can offer valuable insights, such vulnerability scanners may neglect to account for a large number of factors. As such, these vulnerability scanners may not provide a holistic risk assessment that accounts for factors such as the age of various vulnerabilities, brute force attack indicators, exploit availability, and device popularity. As another example, security information and event management (SIEM) systems may be valuable for detecting and responding to specific security events at (or subsequent to) the time they occur. But these same systems may not be tailored specifically for a priori risk assessment of individual devices and their unique characteristics.

Accordingly, there is a growing need and desire for comprehensive and adaptable systems and methods to assess and quantify the risk posed by devices within a network.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 3 is a flow diagram for one embodiment of a method for determining a risk score for a network device.

DETAILED DESCRIPTION

Figure 1:
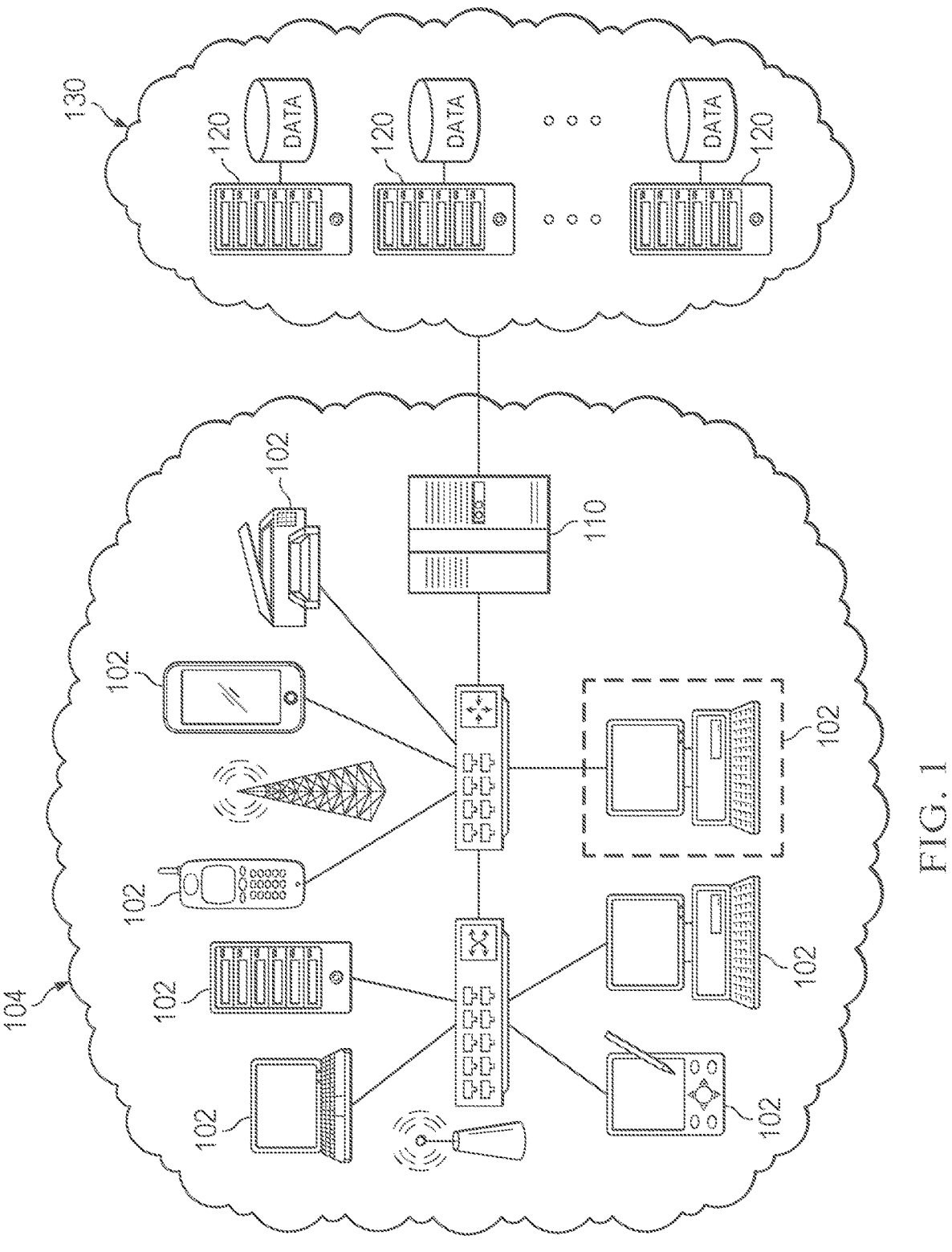
FIG. 1 is a block diagram depicting a general architecture of a network including one embodiment of a risk assessment system.

As discussed, In the rapidly evolving landscape of cybersecurity, assessing the risk posed by devices within a network is a critical task for security professionals. The accurate evaluation of potential vulnerabilities enables organizations to prioritize resources and implement effective countermeasures to mitigate threats. Organizations of all sizes and across various industries, including finance, healthcare, retail, government, technology, and education, confront these challenges as they strive to safeguard their digital assets, protect sensitive information, and maintain their reputations. These same entities (and network security personnel employed by such entities) currently face limitations in their ability to efficiently and effectively evaluate device risk and to prioritize mitigation efforts. These limitations can result in vulnerabilities being overlooked or insufficiently addressed, potentially leading to data breaches and other security incidents.

In the main, this situation exists because current solutions to assess device risk in network environments have largely proven inadequate. To illustrate in more detail, several approaches are typically utilized to tackle these types of problems. Each of these approaches, however, has their own specific flaws. For example, manual tracking and analysis of vulnerabilities in a network (e.g., security vulnerabilities pertaining to network devices) is time-consuming and often prone to human error. While vulnerability scanners (which automatically identify potential weaknesses in systems) can offer valuable insights, such vulnerability scanners may neglect to account for a large number of factors. As such, these vulnerability scanners may not provide a holistic risk assessment that accounts for factors such as the age of various vulnerabilities, brute force attack indicators, exploit availability, and device popularity. As another example, security information and event management (SIEM) systems may be valuable for detecting and responding to specific security events at (or subsequent to) the time they occur. But these same systems may not be tailored specifically for a priori risk assessment of individual devices and their unique characteristics.

Accordingly, there is a growing need for a comprehensive and adaptable method to assess and quantify the risk posed by devices within a network. In particular, there is a need for advanced, data-driven, and adaptable methodologies for calculating risk scores for devices.

To address these needs, among others, attention is directed to embodiments of systems and methods for risk assessment of network devices as disclosed herein. In particular, embodiments may determine risk scores for devices within a network that are highly individualized to each network device by leveraging data from a number of data sources. These data sources may include search results and the determination of dynamic device characteristics visible from observation of the network or device itself to gather relevant information about vulnerabilities, weaknesses, configuration errors or related conditions affecting each device or device type, ensuring a rich and pertinent set of data for risk score calculation.

Such data may include network device data determined based on visibility into, or observations of, the dynamic operations of the network or that specific network device in situ in the network environment. Data from these data sources may be incorporated into one or more device factors representative of the network device's device characteristics. For example, this data may be utilized to determine a popularity factor that accounts for a network device's prevalence within the network or across networks. Such prevalence may include the number of network devices that share that hardware or software within, or across, networks, or observational data pertaining to how often that device is accessed, or the types of access made to that device as determined from observed operational characteristics (e.g., from within the network itself).

Network device data based on the operation of the network may also include data pertaining to the reachability of the network device. This reachability data may be incorporated into a reachability factor that accounts for whether a network device is accessible over the Internet or generally outside a particular network environment, or how accessible the device is (e.g., the number or types of ports or connections the device has open, etc.).

Accordingly, embodiments as disclosed may utilize some form of an initial risk score for a network device. Such an initial risk score may be adjusted by various other factors determined based on the data sources including data pertaining to the network device for which the risk score is being determined, including, for example, a popularity factor determined for the network device or a reachability factor determined for the network device as previously discussed. By using such factors, embodiments may generate a risk score for a network device that (at least partially) reflects the risk of the device based on the operation of that network device in the network, including actually observed dynamic characteristics determined from operation of the device within the network.

An initial risk score for a network device may be determined in almost any manner desired. For example, in one embodiment such an initial risk score may be determined based on one or more vulnerability assessments of the network device. These vulnerability assessments may be obtained from one or more data sources that collect or collate information regarding these vulnerabilities. These data sources may, for example, provide data regarding Common Vulnerabilities and Exploits (CVE) for a type of network device. Thus, these data sources may be searched or otherwise queried (e.g., by device type) for CVEs pertaining to the device. This querying may include obtaining data on CVEs for the device using an Application Programming Interface (API) provided by a data source or using an Internet search engine (e.g., Bing, Google, etc.) to search the Internet, or certain sites on the Internet (e.g., nvd.nist.com), for CVE data pertaining to the device, and processing such data to determine one or more CVEs pertaining to the device. This processing may include performing Natural Language Processing (NLP) or other types of analysis of a set of search results to determine identifiers of CVEs pertaining to the device (e.g., the device type).

Data on the determined CVEs may then be obtained from a data source (e.g., based on identifiers of those CVEs). This obtained CVE data may include data regarding a description of the CVE, a published date of the CVE, a Common Vulnerability Scoring System (CVSS) score for the CVE, a CVSS version, a CVSS risk, Common Platform Enumerations (CPE), a Version end or Version start indicating a software version impacted by the CVE, or a Common Weakness Enumeration (CWE).

The obtained CVEs may thus be used to determine the initial risk score for the device. For example, the CVSS scores for each of the CVEs for a device may be summed to generate the initial risk score. In some embodiments, the list of CVEs pertinent to the device and used to determine the initial risk score may be refined based on known (or unknown) characteristics of the device such as one or more software versions associated with the device. When a software version for a device is known, only obtained CVEs pertaining to software versions of that device may be utilized in determining an initial risk score for that device (e.g. only the CVSS scores for those CVEs may be summed). However, for devices with unknown software versions, the obtained CVEs may not be filtered (e.g., all obtained CVEs may be utilized in determining an initial risk score), however a software version discount factor may be applied when determining an initial (or final) risk score to account for the uncertainty due to the unknown software version. This software version discount factor can be adjusted based on the desired level of conservatism in determining a risk score for the device.

Other factors may also be utilized when determining initial risk scores, for example a time based weighting factor may be determined. In one embodiment, such a time based weighting factor may be determined for each CVE being utilized to determine an initial risk score. Such a time based weighting factor for a CVE may be determined by determining the age of the vulnerability (e.g., the time elapsed since the CVE publication date); defining a decay function that assigns less weight to older CVEs (e.g., exponential decay, linear decay, etc.) and applying the decay function to the age of each CVE to obtain the time based weighting factor. This time based weighting factor can then be applied to the CVSS score for that CVE when determining the initial risk score. In this manner, embodiments may incorporate time based weighting factors to account for the decreasing relevance of older vulnerabilities, ensuring a more accurate representation of current risk.

A brute force factor may also be utilized in determining an initial risk score for a device. This brute force factor may, for example, be determined for each CVE utilized in determining the initial risk score. In one embodiment, for each CVE being utilized, a search for brute force attack related keywords in the CVE description associated with the CVE may be determined (e.g., based on a list of keywords that indicate a brute force attack) may be performed and if a keyword is found, a brute force factor may be determined that increases the corresponding CVSS score of that CVE by a specified percentage when determining the initial risk score.

As another example, an exploit factor may be utilized when determining an initial risk score for a device. As with the brute force factor, such an exploit factor may be determined based on each CVE utilized in determining the initial risk score. Such an exploit factor for a CVE may be determined by searching for exploit data on the CVE (e.g., searching the National Vulnerability Database (NVD) for exploit information; searching GitHub for repositories that contain exploit code for the CVE; etc.). If such exploit data is found, an exploit factor may be determined that increases the corresponding CVSS score of that CVE by a specified percentage when determining the initial risk score.

An initial risk score for a device may thus be determined in some embodiments by summing an adjusted CVSS score for each CVE determined for that network device, where the adjusted CVSS score for a CVE comprises the CVSS score for that CVE multiplied by any additional weighting factors determined for that CVE (e.g., a time based weighting factor, a brute force weighting factor, an exploit weighting factor, etc.).

To determine the risk score for the network device, then, this initial risk score is adjusted by the factors determined based on observed data pertaining to the network device for which the risk score is being determined, including, for example, a popularity factor determined for the network device or a reachability factor determined for the network device as discussed previously.

Accordingly, embodiments may determine risk scores for network devices in a manner that provides for a number of advantages. In general, the determination of a risk score based on gathered CVEs taking into account various factors, including versions of software employed by a network device, may give an overall understanding of the risk associated with the device by allowing the determination of a risk score for almost any device type and the presentation of such a risk score to a user.

Moreover, embodiments may account for factors such as the age of vulnerabilities, brute force attack indicators, exploit availability, and device popularity; providing a thorough evaluation of device risk. Namely, embodiments may utilize time based weighting to account for the decreasing relevance of older vulnerabilities, with different decay functions depending on whether a software version for a device is known or unknown. Embodiments may also identify the presence of brute force attack related keywords, which may indicate vulnerabilities more likely to be exploited in practice. Certain embodiments may additionally incorporate exploit availability into the risk score calculation, reflecting the actual threat posed by each vulnerability. Importantly, embodiments may also adjust the risk score for a device based on that device's popularity, recognizing that popular devices may be more attractive targets for attackers. Embodiments may also confine the data sources utilized to determine risk scores resulting in improvement to such risk scores, such as by restricting the Internet searches to specific domains like the NVD website and gathering relevant CVEs (e.g., using NLP) for a device (e.g., device type) to yield a pertinent set of data points to analyze in the generation of risk scores. Overall then, embodiments as disclosed may provide a versatile and data-driven approach to calculate comprehensive risk scores for devices across a wide range of scenarios, providing valuable insights into their potential vulnerabilities and facilitating informed decision-making for security professionals or other consumers of device risk assessment.

At least because of these advantages, embodiments as disclosed may be well-suited to, and advantageously utilized by, a wide range of users. For example, security professionals and Information Technology (IT) administrators may use embodiments to identify and prioritize vulnerabilities in their network, allowing them to allocate resources and implement countermeasures effectively. Organizations and businesses of all sizes and across various industries can utilize embodiments to assess and manage their cybersecurity posture, ensuring the protection of their sensitive data and digital assets. Managed security service providers (MSSPs): can incorporate embodiments into their services, offering comprehensive vulnerability assessment and risk management solutions to their clients. Cybersecurity developers developing security tools or other software may integrate embodiments into this software, enhancing that software's vulnerability assessment capabilities and providing more accurate risk scores to users. More generally, then, given its versatile and data-driven approach to calculating risk scores for devices, embodiments may be broadly adopted across various industries and sectors, benefiting a wide array of users in managing their cybersecurity risks.

Turning now to FIG. 1, a block diagram depicting a general architecture of a network including one embodiment of a risk assessment system is presented. Network 104 includes a number of communicatively connected computing devices 102 (referred to herein as network devices without loss of generally). These network devices 102 may be connected through one or more wired or wireless communication networks such as a Local Area Network (LAN), a Wide Area Network (WAN), an internet (e.g., the Internet), an intranet, a cellular network, or almost any other type of communication network. It will be noted that network 104 may include one or multiple types of communication networks and that the network devices 102 on the network 104 may be connected to other networks (e.g., the Internet) through the network 104. Network devices 102 included in network 104 may thus include a number of different types of devices, including devices comprising the infrastructure of the network such as routers, switches, gateways, firewalls, etc., computing devices on the network such as servers or personal computers, devices such as smartphones, tablets, printers, Internet of Things (IoT) devices such as household devices (e.g., thermostats, refrigerators, etc.) or almost any other device that may be communicatively coupled over a wired or wireless network. Each of the devices 102 is thus of a particular type (e.g., device type) defined by the hardware (e.g., manufacturer or model designation of the hardware of device 102) or the software of the device 102 (e.g., name and version of an operating system or other application on device 102).

One of the network devices 102 of the network 104 may be a risk assessment system 110. Risk assessment system 110 may include one more computing devices adapted to generate risk scores for devices 102 on the network 104. Risk assessment system 110 may, for example, be part of a larger network security system for network 104 that observes, determines, records, and makes accessible data regarding the operation of network 104 and devices 102 on network 104 such as an intrusion detection systems (IDS), an intrusion prevention systems (IPS) a network detection and response (NDR) system, or another type of network security system. Accordingly, risk assessment system 110 may have visibility into the operation of network 104 and devices 102 on network 104 at the packet (e.g., via packet inspection), network, device, workload, application, or user level, and may maintain such data on network devices 102. Such data on network device 102 may include dynamic device characteristics visible from observation of network 104 or device 102 regarding vulnerabilities, weaknesses, configuration errors or related conditions affecting each device 102 or device type of devices 102. This type of network device data may comprise observational data pertaining to how often device 102 is accessed, or the types of access made to device 102 (e.g., as determined from observed operational characteristics from within network 104 itself). Network device data may also include data pertaining to the reachability of the device 102 such as whether device 102 is accessible over the Internet or generally outside a network 104, or how accessible the device 102 is (e.g., the number or types of ports or connections device 102 has open, etc.).

Risk assessment system 110 is adapted to determine risk scores (e.g., any indicator of risk which may be a numerical indicator, a textual indicator, a graphical indicator, etc.) for devices 102 within network 104 that are highly individualized to each network device 102 by leveraging data from a number of data sources. These data sources may include search results, data from (e.g., external data sources) or the dynamic network device data determined from observation of the network 104 or device 102 itself to gather relevant information about vulnerabilities, weaknesses, configuration errors or related conditions affecting each device 102 or device type, ensuring a rich and pertinent set of data for risk score calculation.

Risk assessment system 110 may also obtain and utilize network device data on devices 102 or device types from one or more external data sources 120. Such data sources 120 may include data sources accessible over a network 130 such as the Internet. These data sources 120 may include external services or tools that offer interfaces (e.g., Application Programming Interfaces (APIs) RESTful interfaces, etc.) through which requests for network device data may be requested. Examples of these types of data sources 120 may include Shodan which indexes the Internet (e.g., devices thereon) and determines devices and ports exposed to the Internet (e.g., which may be accessed via the Shodan Exploit API), Fing which may allow access to device popularity scores for various device types, or GitHub (e.g., accessible through the GitHub API) that may include data on exploits. Other external data sources 120 may include Internet websites such as the National Vulnerability Database (NVD) maintained by the National Institute of Standards and Technology (NIST), or (e.g., Internet). Search engines such as Google® or Bing® may also be used to search data source 120 on network 130 (e.g., the Internet) based on characteristics of devices 102 or device types.

Risk assessment system 110 can thus generate a risk score for a network device 102 from network device data associated with the device 102. This risk score may be presented or otherwise made available to users of risk assessment system 110. In generating this risk score for a device 102, risk assessment system 110 may incorporate network device data for device 102 into one or more device factors representative of that network device's characteristics. For example, network device data may be utilized to determine a popularity factor that accounts for the network device's prevalence within the network 104 or across networks (e.g., networks 104, 130, which may include portions of one another or be the same network). Such prevalence may include the number of network devices 102 that share the hardware or software of that network device 102 within, or across, networks (e.g., networks 104, 130), or observational data pertaining to how often that device 102 is accessed, or the types of access made to that device as determined from observed operational characteristics (e.g., dynamic device data determined by risk assessment system 110 from within the network 104 itself). As another example, network device data for device 102 may also include data pertaining to the reachability of the network device 102. Risk assessment system 110 may thus use network device data to determine a reachability factor that accounts for whether a network device 102 is accessible over the Internet or generally outside network 104, or how accessible the device is (e.g., the number or types of ports or connections the device has open, etc.).

Accordingly, to generate a risk score for device 102, the risk assessment system 110 may first generate an initial risk score for network device 102. Such an initial risk score may then be adjusted by various other factors determined based on network device data associated with the device 102 (e.g., as determined from network device data from external data sources 120 or observed dynamic network device data determined by the risk assessment system 110) including, for example, a popularity factor determined for that network device 102 or a reachability factor determined for that network device 102. By using such factors, embodiments of the risk assessment system 110 may generate a risk score for network device 102 that (at least partially) reflects the risk of the device 102, and in some cases may be based on observed dynamic operation of that network device 102 in the network 104.

Figure 2A:
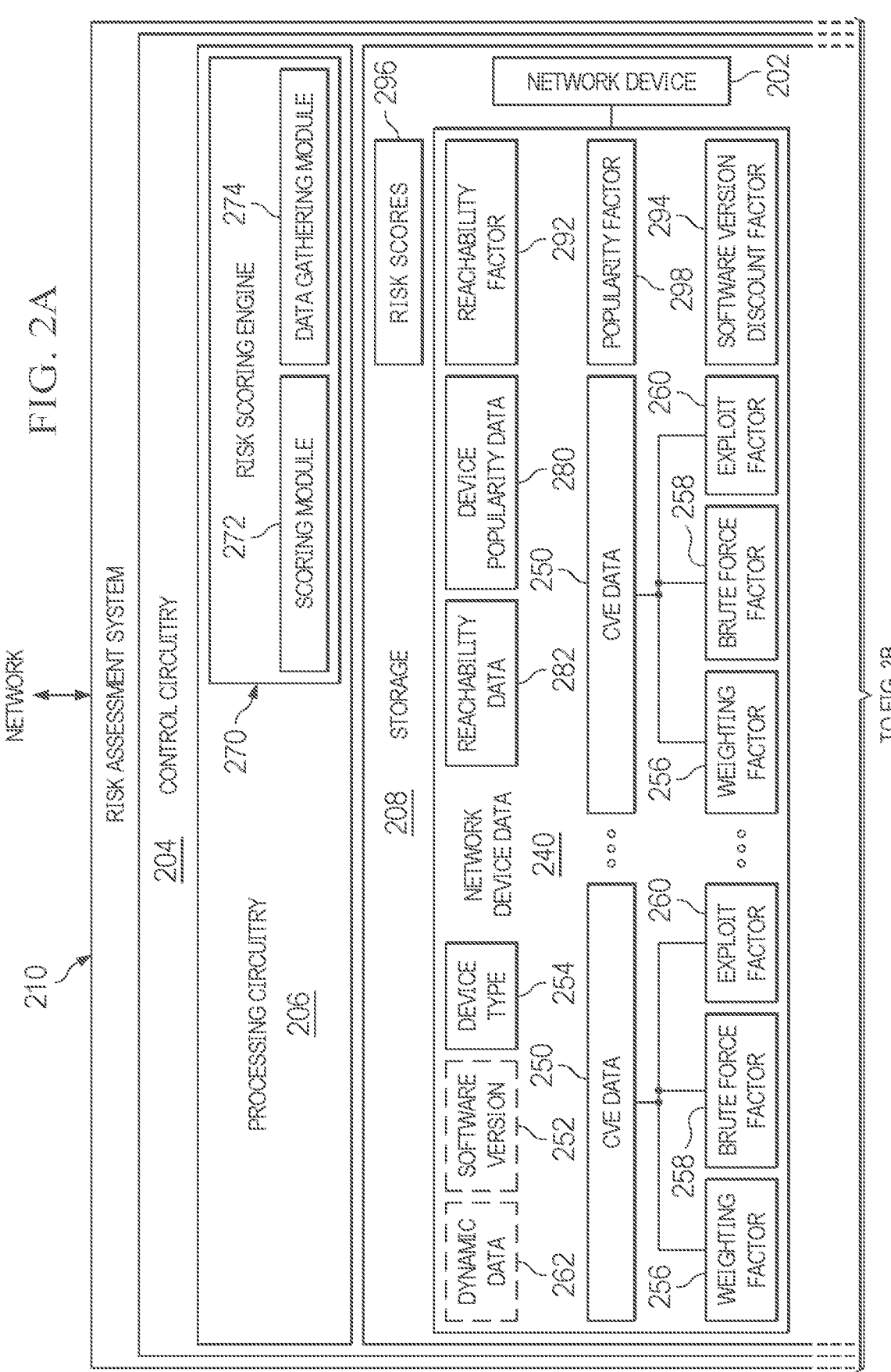
FIG. 2 (comprising FIGS. 2A and 2B) is a more specific block diagram of an embodiment of a risk assessment system.
Figure 2B:
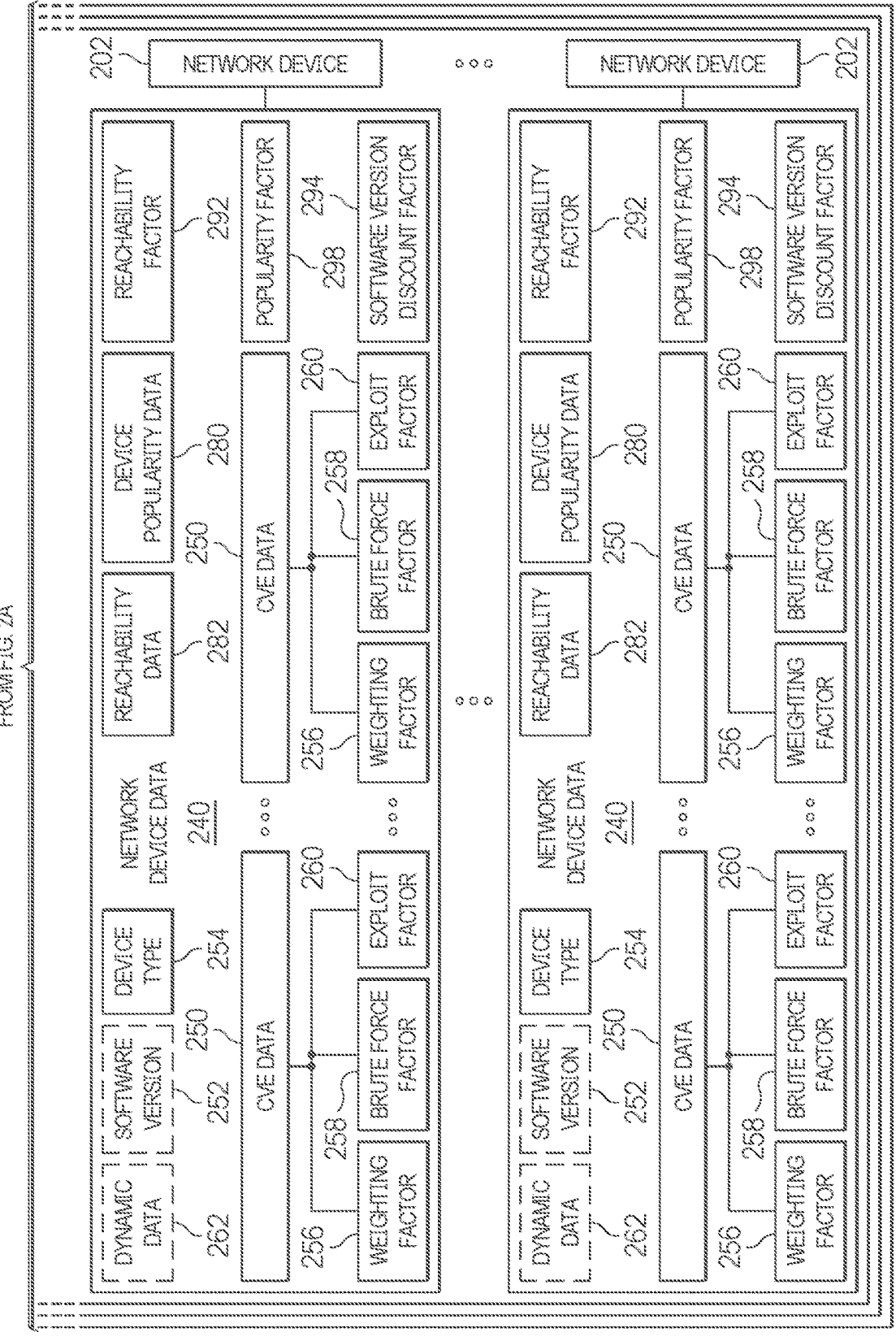

Moving to FIG. 2 an architecture for one embodiment of a risk assessment system is depicted. Here, risk assessment system 210 may be a computing device which includes processing circuitry 206 and storage (i.e., memory) 208. Control circuitry 204 may send and receive commands, requests, and other suitable data using an I/O path. Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Storage 208 may be an electronic storage device that includes volatile random-access memory (RAM) which does not retain its contents when power is turned off, and non-volatile RAM, which does retain its contents when power is turned off. As referred to herein, the phrase "storage", "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

Risk assessment system 210 may store identifiers or other representations 202 (e.g., objects) of devices in a network that includes risk assessment system 210, and associate network device data 240 with these representations 202 of network device 202 (for ease of description herein, representations 202 of network devices will be referred to also just as "network devices"). This network device data 240 may include device type data 254 indicating the hardware (e.g., manufacturer or model designation of the hardware of device) or the software of the device. In some cases, the network device data 240 may also include software version data 252 indicating, for example, a name or version of an operating system or other applications on network device 202.

As discussed, in some cases, risk assessment system 210 may be implemented with, or be included in, an NDR system or another type of network security system. Thus, network device data 240 associated with network device 202 may include dynamic data 262 on the operation of the network including risk assessment system 210 and network devices 202 determined at the packet (e.g., via packet inspection), network, device, workload, application, or user level, such as dynamic device characteristics visible from observation of network or device 202 (or data communicated to, or originating from network device 202) such as frequency or types of access, reachability or accessibility of device, open ports on the device or other observed data pertaining to the network device 202.

Risk assessment system 210 also includes risk scoring engine 270 (e.g., a set of instructions that may be executed on processing circuitry 206) adapted for generating risk scores (e.g., any indicator of risk which) for network devices (e.g., represented network devices 202) based on network device data 240 associated with the device. Risk scoring engine 270 includes data gathering module 274 for obtaining network device data 240 from external data sources (i.e., sources of data external to risk assessment system 210) and scoring module 272 for generating the risk scores 296 which may be stored in storage 208. It will be noted that both data gathering module 274 and scoring module 272 may operate in a synchronous or asynchronous manner to one another, where each may operate at certain time intervals (e.g., data gathering or risk scoring may occur at certain time intervals) or on demand when requested (e.g., by a user, another application or module, through web services request, etc.). In this manner, risk scores for device 202 may not be static and may be continuously updated (e.g., as new vulnerabilities are discovered or as the software versions on device 202 change).

In certain embodiments, data gathering module 274 may obtain CVE data 250 on each of a set of CVEs associated with network device 202 from data sources based on device type 254 of the network device 202. Thus, these data sources may be searched or otherwise queried (e.g., by device type 254) for CVEs pertaining to the device 202 (e.g., the device type 254 of the device 202). This querying may include obtaining data on CVEs for the device using an Application Programming Interface (API) provided by a data source. For example, the Shodan Exploit API may be queried by device type 254 to obtain resulting identifiers for CVEs associated with that device type 254. Additionally, using an Internet search engine (e.g., Bing, Google, etc.) data gathering module 274 may perform an Internet search of certain sites on the Internet (e.g., nvd.nist.com), for CVEs pertaining to the device type 254. The returned search results may be processed to determine identifiers of one or more CVEs pertaining to device 202. This processing may include performing NLP or other types of analysis of the search results (e.g., the titles of the pages returned in the search results).

CVE data 250 on each of the determined CVEs may then be obtained from a data source (e.g., based on identifiers of those CVEs) and stored in network device data 240. This obtained CVE data may include data regarding a description of the CVE, a published date of the CVE, a CVSS score for the CVE, a CVSS version, a CVSS risk, CPEs (e.g., list), a Version end or Version start indicating a software version (or range) impacted by the CVE, or CWEs (e.g., list). Thus, CVE data 250 for each of a set of CVEs associated with each device 202 may be stored in network device data 240 for device 202.

Data gathering module 274 may also determine device popularity data 280 and reachability data 282 and store the device popularity data 280 and reachability data 282 as network device data 240 for device 202. For example, device popularity data 280 for a device may be fetched from Fing (https://dev.embedtech.lansweeper.com/) and may be a score from 0-100, while reachability data 282 may be data pertaining to whether device 202 is reachable from the Internet that may be obtained from Shodan or a similar service.

Scoring module 272 utilizes network device data 240 for network device 202 in determining a risk score for that network device 202. To determine a risk score for network device 202, scoring module 272 may first determine an initial risk score. To determine the initial risk score, the scoring module 272 may identify a set of CVEs associated with the network device 202 to utilize for generating a risk score from CVE data 250 of network device data 240 associated with network device 202. If software version 252 is included in network device data 240 associated with network device 202 (e.g., an operating system version or the like), the CVEs for the network device may be filtered to exclude CVEs that do not apply to software version 252 (e.g., software version 252 is compared to the Version end or Version start for a CVE in CVE data 250 and the CVE is excluded (if the software version 252 does not match the Version end or Version start in CVE data 250). If no software version 252 is included in network device data 240 all CVEs in network device data 240 may be utilized in generating an initial risk score.

Scoring module 272 can then use the CVSS score in CVE data 250 for each of the determined set of CVEs to determine the initial risk score (e.g., by summing the CVSS scores). In some embodiments, scoring module 272 may determine one or more factors for applying to the CVSS score for a CVE to adjust the CVSS score for that CVE before it is summed.

For example, scoring module 272 can determine a time based weighting factor 256 for each of the determined set of CVEs associated with device 202, Such a time based weighting factor 256 for a CVE may be determined by determining the age of the CVE (e.g., the time elapsed since the CVE publication date) included in the CVE data for that CVE. The scoring module 272 can then define a decay function that assigns less weight to older CVEs (e.g., exponential decay, linear decay, etc.) and applying the decay function to the age of that CVE to obtain the time based weighting factor 256 for that CVE. In one embodiment, for example, an exponential decay function with a half-life of one year (365 days) may be used as the decay function. This function would give a weighting factor of 0.5 for a vulnerability that is one year old, 0.25 for a vulnerability that is two years old, and so on. This time based weighting factor 256 can be applied to the CVSS score for that CVE before it is summed to generate an initial risk score.

For each of the set of CVEs being used to determine an initial risk score, scoring module 272 may also determine if a brute force attack is associated with that CVE. For example, to determine if a brute force attack is associated with a CVE, the CVE description in CVE data 250 for that CVE may be processed to determine the presence of brute force attacks. In one embodiment, scoring module 272 may check for the presence of brute force attack-related keywords in the CVE description of the CVE data 250 for that CVE (e.g., keywords that indicate brute force attacks, such as "RDP", "Telnet", "FTP", "SSH", "HTTP", etc.) by searching the CVE description of the CVE data 250 for the presence of any of these keywords. If a keyword is found, scoring module 272 may determine brute force weighting factor 258 (e.g., 1.2) for that CVE. Brute force weighting factor 258 may be applied to a CVSS score of a CVE before it is summed to generate an initial risk score to, for example, increase the CVSS score of the affected CVE by a specified percentage (e.g., when a brute force keyword is detected).

As another example, scoring module 272 may attempt to determine exploit weighting factor 260 for each CVE when determining an initial risk score for a device. Such an exploit weighting factor for a CVE may be determined by searching for exploit data on the CVE (e.g., searching the National Vulnerability Database (NVD) for exploit information; searching GitHub for repositories that contain exploit code for the CVE; searching other reliable vulnerability and exploit databases, such as the Exploit Database or Known Exploited Vulnerabilities (KEV) Database etc.). For example, the GitHub searchsploit library can be used to probe the exploit database of GitHub. Additionally, these GitHub APIs may be utilized to examine repositories for exploit code or proof of concept related to the CVE. All CVEs in the KEV database (https://www.cisa.gov/known-exploited-vulnerabilities-catalog) are compiled, and the database may be utilized to determine whether a CVE has been exploited. If such exploit data is found, exploit weighting factor 260 (e.g., 1.3) for that CVE. Exploit weighting factor 260 may be applied to a CVSS score of a CVE before it is summed to generate an initial risk score to, for example, increase the CVSS score of the affected CVE by a specified percentage (e.g., when an exploit data associated with that CVE is detected).

Scoring module 272 can thus determine an initial risk score for device 202 by summing the CVSS score for each CVE determined for that network device 202 (e.g., all of the CVEs associated with the device 202 or the filtered set of CVEs associated with the software version 252 of network device 202). Before the CVSS score for a CVE is summed, the CVSS score for that CVE may be adjusted by any additional weighting factors determined for that CVE (e.g., time based weighting factor 256, brute force weighting factor 258 or exploit weighting factor 260 determined for that CVE). Such an adjustment may include multiplying the CVSS score (or a previously adjusted CVSS score) for that CVE by the weighting factor.

Accordingly, in one embodiment, the formula for determining an initial risk score may thus be initial risk score=> (CVSS [i]*W [i]*BF [i]*EF [i]) where CVSS [i] is the CVSS score of the i-th filtered CVE, W [i] is the time-based weighting factor for the i-th filtered CVE, calculated using: W [i]=exp (−age_in_days [i]/365), BF [i] is the brute force weighting factor for the i-th filtered CVE, which is equal to the defined brute force weighting factor (e.g., 1.2) if a brute force keyword is found in the i-th filtered CVE's description, and 1 otherwise and EF [i] is the exploit weighting factor for the i-th filtered CVE, which is equal to the defined exploit factor (e.g., 1.3) if an exploit is available for the i-th filtered CVE, and 1 otherwise.

In some embodiments, when determine a score for device 202 where software version 252 is not present (e.g., for device 202 with unknown software versions and where the CVEs for that device 202 are not filtered), a software version discount factor 294 may be applied when determining the initial risk score to account for the uncertainty due to the unknown software version. This software version discount factor can be adjusted based on the desired level of conservatism in determining a risk score for the device. It will be noted that, in some embodiments, such a software discount factor may be applied to a finally determined risk score for device 202, instead of, or additional to, the application of the software discount factor to the initial risk score for device 202.

Once the initial risk score is determined, scoring module 272 may adjust the initial risk score by a popularity factor 298 that accounts for a network device's prevalence within the network or across networks. Such prevalence may include the number of network devices that share that hardware or software within, or across, networks, or observational data pertaining to how often that device is accessed, or the types of access made to that device as determined from observed operational characteristics (e.g., from within the network itself as stored in any dynamic data 262). In one embodiment, for example a device popularity factor (DPF) for device 202 may be determined based on the device popularity value (0-100) in device popularity data 280 such that DPF=1+ (device_popularity/100).

Scoring module 272 may also adjust the initial risk score by a (internet) reachability factor (IRF) This reachability factor 292 may be determined based on network device data 240 pertaining to reachability of the network device including reachability data 282 and or reachability data included in dynamic data 262. This reachability data may be incorporated into a reachability factor that accounts for whether a network device is accessible over the Internet or generally outside a particular network environment, or how accessible the device is (e.g., the number or types of ports or connections the device has open, etc.). In one embodiment, if device 202 is reachable, a higher value (e.g., 1.5) may be assigned to the IRF while if the device 202 is not reachable the IRF may be to 1.

In one embodiment, therefore, scoring module 272 may adjust the determined initial risk score for device 202 to determine a risk score for device 202 according to the following formula risk score=DPF*IRF*Initial Score, where risk score is the calculated risk score for the device, DPF is the device popularity factor, calculated using: DPF=1+ (device_popularity/100), IRF is the Internet Reachability Factor, which is equal to a defined value (e.g., 1.5) if the device is reachable from the Internet, and 1 otherwise.

Risk scoring engine 270 can then return, provide, store, or otherwise utilize a risk score for device 202. For example, such a risk score may be used to prioritize mitigation efforts, allocate resources, or inform decisions regarding operation of a network.

Looking now at FIG. 3, one embodiment of a method for determining a risk score for a network device is depicted. Embodiments of such a method may be applied, for example by a risk assessment system in a network to determine risk scores for network devices in that network. To determine a risk score for a network device, a set of CVEs may be obtained for the network device (STEP 302). It can then be determined if a software version is known for the device 304). If the software version is known (Y Branch of STEP 304) the CVEs for the network device may be filtered to exclude CVEs that do not apply to the software version of the network device from the determined set of CVEs (STEP 306).

If a software version 252 is not known for the network device (N Branch of STEP 304) a software version discount factor may be determined (STEP 308). This software version discount factor can be adjusted based on the desired level of conservatism in determining a risk score for the device.

For each CVE of the (e.g., filtered or unfiltered) set of CVEs a time weighting factor may be determined (STEP 310). Such a time based weighting factor for a CVE may be determined by determining the age of the CVE (e.g., the time elapsed since the CVE publication date) included in the CVE data for that CVE. A decay function can be applied to the age of that CVE to obtain the time based weighting factor for that CVE.

Additionally, for each of the set of CVEs for the device, it can be determined if a brute force attack is associated with that CVE. Specifically, the presence of a brute force attack in association with that CVE can be determined (STEP 312). In one embodiment, the presence of a brute force attack may be determined based on the presence (or lack of presence) of attack-related keywords in the CVE description of that CVE. If a brute force attack is present (Y Branch of STEP 314) a brute force weighting factor for that CVE may be determined (STEP 316).

Similarly, for each of the set of CVEs for the device it can be determined if exploits are associated with that CVE. In particular, the presence of exploits in association with that CVE can be determined (STEP 318). In one embodiment, the presence of an exploit may be determined by searching one or more exploit repositories or other data sources for exploits associated with that CVE. If an exploit is associated with that CVE (Y Branch of STEP 320) an exploit weighting factor for that CVE may be determined (STEP 322).

An initial risk score can then be determined for that device (STEP 324). For example, this initial risk score may be determined by summing the CVSS score for each of the CVEs determined for that network device (e.g., all of the CVEs associated with the device or the filtered set of CVEs associated with the network device). Before the CVSS score for a CVE is summed, the CVSS score for that CVE may be adjusted by any time based weighting factor, brute force weighting factor or exploit weighting factor determined for that CVE). Additionally, the initial risk score may be adjusted by applying a software version discount factor in cases where the CVEs for the network device were not filtered based on a software version.

A device popularity factor can then be determined (STEP 326) along with an internet reachability factor (STEP 328), and these factors can be used to determine a risk score for the device by adjusting the initial risk score with those factors (STEP 330). The device popularity factor may be based on a determined popularity value such as one obtained from a data source that provides such popularity values, or may be determined based on dynamically observed network device data that accounts for a network device's prevalence within the network or across networks. The internet reachability factor may be determined based on network device data pertaining to reachability of the network device and may reflect the accessibility of the device over the Internet or generally outside a particular network environment, an accessibility level of the device is (e.g., the number or types of ports or connections the device has open, etc.). The risk score for the device can thus be determined by adjusting (e.g. multiplying) the initial risk score for the device based on the device popularity factor and internet reachability factor.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for providing a risk score for a network device, comprising:
determining an initial risk score for the network device in a network based on a Common Vulnerability Scoring System (CVSS) score associated with each of one or more CVEs associated with the network device, wherein the CVSS score associated with each of the one or more CVEs is adjusted based on a weighting factor, and wherein the one or more CVEs are obtained at a risk assessment system by issuing a query associated with the network device from the risk assessment system through an interface provided by a CVE data source and analyzing a result of the query received at the risk assessment system to determine the one or more CVEs;
determining one or more factors based on network device data on dynamic operation of the network or the network device in the network, the network device data including data associated with reachability of the network device in the network;
generating a risk score for the network device by adjusting the initial risk score based on the one or more factors determined for the network device based on the network device data including data associated with reachability of the network device in the network;
storing the risk score; and
providing the risk score to a user.

2. The method of claim 1, wherein the one or more factors include a popularity factor or a reachability factor.

3. The method of claim 1, wherein the one or more Common Vulnerabilities and Exploits (CVE) are for a type of the network device.

4. The method of claim 3, further comprising:
obtaining a set of CVEs for the type of the network device;
determining if a software version is known for the network device;
when the software version is known, determining one or more CVEs on which the initial risk score is based from the set of CVEs based on an association of the one or more CVEs to the software version for the network device; and
when the software version is unknown, using the set of CVEs as the one or more CVEs for determining the initial risk score.

5. The method of claim 4, wherein obtaining the set of CVEs comprises searching the Internet using a search engine.

6. The method of claim 5, wherein the search is restricted to one or more web sites.

7. The method of claim 1, wherein the weighting factor includes a time-based weighting factor, a brute force weighting factor, or an exploit weighting factor.

8. A method for providing a risk score for a network device, comprising:
determining a set of Common Vulnerabilities and Exploits (CVE) for a network device in a network by issuing a query associated with the network device from a risk assessment system through an interface provided by a CVE data source and analyzing a result of the query received at the risk assessment system to determine the set of CVEs;
determining if a software version is associated with the network device;

when the software version is associated with the network device, filtering the set of CVEs based on the software version of the network device;

determining an initial risk score for the network device based on the set of CVEs for the network device;

generating a risk score for the network device by adjusting the initial risk score based on one or more factors associated with the network device, wherein the one or more factors include a popularity factor based on an obtained popularity score or a reachability factor associated with a reachability of the network device in the network;

storing the risk score; and providing the risk score to a user.

9. The method of claim 8, further comprising:

when the software version is not associated with the network device, determining a software version discount factor; and adjusting the initial risk score or the risk score using the software version discount factor.

10. The method of claim 8, wherein determining the set of CVEs comprises searching using a search engine to obtain search results and processing the search results using Natural Language Processing (NLP) to identify the set of CVEs.

11. The method of claim 8, wherein the initial risk score is determined based on a Common Vulnerability Scoring System (CVSS) score associated with each of the set of CVEs.

12. The method of claim 11, further comprising adjusting the CVSS score associated with at least one of CVEs based on a weighting factor.

13. The method of claim 12, wherein the weighting factor includes a time-based weighting factor, a brute force weighting factor, or an exploit weighting factor.

14. The method of claim 13, wherein the time-based weighting factor is based on an age of the at least one CVE.

15. The method of claim 13, wherein the brute force weighting factor is determined based on a description associated with the at least one CVE.

16. A risk assessment system, comprising:

a processor; and a non-transitory computer readable medium, comprising instructions executable on the processor for:

determining a set of Common Vulnerabilities and Exploits (CVE) for a network device by issuing a query associated with the network device from the risk assessment system through an interface provided by a CVE data source and analyzing a result of the query received at the risk assessment system to determine the set of CVEs;

determining if a software version is associated with the network device;

when the software version is associated with the network device, filtering the set of CVEs based on the software version of the network device;

when the software version is not associated with the network device, determining a software version discount factor;

determining an initial risk score for the network device based on adjusting a Common Vulnerability Scoring System (CVSS) score associated with each of the set of CVEs for the network device adjusted based on a weighting factor, including adjusting the initial risk score by the software discount factor when the software version is not associated with the network device;

generating a risk score for the network device by adjusting the initial risk score based on a popularity factor based on an obtained popularity score or a reachability factor associated with a reachability of the network device in the network; and providing the risk score to a user.

* * * * *